(12) United States Patent
Lai et al.

(10) Patent No.: US 9,746,721 B2
(45) Date of Patent: Aug. 29, 2017

(54) DISPLAY PANEL COMPRISING FIRST AND SECOND SUB-PIXELS ON A FIRST SUBSTRATE CORRESPONDING RESPECTIVELY TO FIRST AND SECOND ELECTRODE PATTERNS ON A SECOND SUBSTRATE

(71) Applicant: Au Optronics Corporation, Hsinchu (TW)

(72) Inventors: Cheng-Wei Lai, Taichung (TW);
Cho-Yan Chen, Taichung (TW);
Tien-Lun Ting, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 234 days.

(21) Appl. No.: 14/813,133

(22) Filed: Jul. 30, 2015

(65) Prior Publication Data

US 2016/0299383 A1 Oct. 13, 2016

(30) Foreign Application Priority Data

Apr. 10, 2015 (TW) .............................. 104111597 A

(51) Int. Cl.
*G02F 1/1362* (2006.01)
*G02F 1/1343* (2006.01)
*G02F 1/1337* (2006.01)

(52) U.S. Cl.
CPC .... *G02F 1/134309* (2013.01); *G02F 1/13624* (2013.01); *G02F 1/133707* (2013.01);
(Continued)

(58) Field of Classification Search
CPC .......... G02F 2001/13685; G02F 2001/134318; G02F 2001/136245
See application file for complete search history.

(56) References Cited

U.S. PATENT DOCUMENTS

| 8,179,354 B2 | 5/2012 | Chen et al. |
| 2009/0109160 A1 | 4/2009 | Chen et al. |

(Continued)

FOREIGN PATENT DOCUMENTS

| CN | 102305983 | 1/2012 |
| CN | 102662280 | 9/2012 |

(Continued)

*Primary Examiner* — Paul Lee
(74) *Attorney, Agent, or Firm* — Jianq Chyun IP Office

(57) ABSTRACT

A display panel including a plurality of pixel units is provided. Each pixel unit includes a first substrate, a second substrate and a display media therebetween. The first substrate includes a first sub-pixel and a second sub-pixel adjacent to the first sub-pixel. The first sub-pixel includes a first active device and a first pixel electrode electrically connected to the first active device, wherein the first pixel electrode has a first main slit and a plurality of first branch slits connected thereto. The second sub-pixel includes a second active device and a second pixel electrode electrically connected to the second active device, wherein the second pixel electrode has a second main slit and a plurality of second branch slits connected thereto. The second substrate includes a first electrode pattern and a second electrode pattern respectively corresponding to the first pixel electrode and the second pixel electrode, and a connecting portion therebetween.

19 Claims, 12 Drawing Sheets

(52) U.S. Cl.
CPC ............ *G02F 2001/134318* (2013.01); *G02F 2001/134345* (2013.01)

(56) References Cited

U.S. PATENT DOCUMENTS

| | | | | |
|---|---|---|---|---|
| 2009/0230396 A1* | 9/2009 | Na | .................... | G02F 1/133707 257/59 |
| 2009/0244459 A1 | 10/2009 | Fujinawa et al. | | |
| 2010/0007830 A1* | 1/2010 | Kim | .................... | G02F 1/1337 349/124 |
| 2010/0134742 A1* | 6/2010 | Kim | .................... | G02F 1/133707 349/141 |
| 2010/0149464 A1* | 6/2010 | Han | .................... | G02F 1/133512 349/106 |
| 2010/0195034 A1* | 8/2010 | Lee | .................... | G02F 1/133753 349/124 |
| 2011/0128492 A1* | 6/2011 | Kim | .................... | G02F 1/133514 349/144 |
| 2012/0182514 A1* | 7/2012 | Choi | .................... | G02F 1/134309 349/143 |
| 2012/0249940 A1* | 10/2012 | Choi | .................... | G02F 1/133753 349/123 |
| 2013/0057818 A1* | 3/2013 | Cho | .................... | G02F 1/134363 349/141 |
| 2013/0077006 A1* | 3/2013 | Jung | .................... | G02F 1/134363 349/41 |
| 2013/0258262 A1* | 10/2013 | Lee | .................... | G02F 1/133707 349/123 |
| 2014/0104523 A1* | 4/2014 | Jung | .................... | G02F 1/1343 349/41 |
| 2014/0184973 A1* | 7/2014 | Kim | .................... | G02F 1/136209 349/43 |

FOREIGN PATENT DOCUMENTS

| | | |
|---|---|---|
| JP | H1096926 | 4/1998 |
| TW | 200919039 | 5/2009 |
| TW | 201237519 | 9/2012 |

* cited by examiner

DISPLAY PANEL COMPRISING FIRST AND SECOND SUB-PIXELS ON A FIRST SUBSTRATE CORRESPONDING RESPECTIVELY TO FIRST AND SECOND ELECTRODE PATTERNS ON A SECOND SUBSTRATE

CROSS-REFERENCE TO RELATED APPLICATION

This application claims the priority benefit of Taiwan application serial no. 104111597, filed on Apr. 10, 2015. The entirety of the above-mentioned patent application is hereby incorporated by reference herein and made a part of this specification.

BACKGROUND OF THE INVENTION

Field of the Invention

The invention relates to a display panel, and particularly relates to a display panel with a high transmittance.

Description of Related Art

In view of development of displays, along with progress of optoelectronics techniques and semiconductor manufacturing techniques, liquid crystal display (LCD) having advantages of high image quality, better space usage efficiency, low power consumption, no irradiation, etc., has gradually become a mainstream in the market.

The LCD includes a backlight module and a liquid crystal display panel. In view of a manufacturing technique of the liquid crystal display panel, a technique of polymer stabilized alignment (PSA) is developed, and in such technique, a polymer alignment is used in collaboration with pixel electrodes having to a plurality of branch slits to form a multi-domain alignment. A liquid crystal material is doped with polymerizable molecules (monomers) (which is referred to as a liquid crystal mixture hereinafter) with a proper concentration. Then, a voltage is exerted to the liquid crystal mixture. When the voltage is exerted to stably arrange the liquid crystal molecules, the polymerizable molecules (monomers) can be bonded to form a polymer layer through ultraviolet irradiation, so as to complete the stabilized alignment process.

A problem of a pixel electrode pattern used by the current PSA technique is that when the voltage is exerted, the liquid crystal molecules tilt towards a pixel center to form the multi-domain alignment. However, the liquid crystal molecules of different regions push each other at a boundary of the regions to form a cross darkstripe, and when a width of the cross darkstripe is too large, it may cause a problem of transmittance reduction.

SUMMARY OF THE INVENTION

The invention is directed to a display panel, in which by changing a tilt direction of liquid crystal molecules in a polymer stabilized alignment (PSA) mode, a width of a cross darkstripe formed by liquid crystal molecules pushing each other at a boundary of different regions is reduced, so as to improve a transmittance of the display panel.

The invention provides a display panel including a plurality of pixel units. Each of the pixel units includes a first substrate, a second substrate and a display media between the first substrate and the second substrate. The first substrate includes a first sub-pixel and a second sub-pixel adjacent to the first sub-pixel. The first sub-pixel includes a first active device and a first pixel electrode electrically connected to the first active device, where the first pixel electrode has a first main slit and a plurality of first branch slits connected to the first main slit. The second sub-pixel includes a second active device and a second pixel electrode electrically connected to the second active device, where the second pixel electrode has a second main slit and a plurality of second branch slits connected to the second main slit. An edge of the first pixel electrode and an edge of the second pixel electrode have a shortest distance therebetween. The second substrate is disposed opposite to the first substrate, and includes a first electrode pattern corresponding to the first pixel electrode and a second electrode pattern corresponding to the second pixel electrode. The second electrode pattern and the first electrode pattern have a gap width therebetween. A connecting portion is located between the first electrode pattern and the second electrode pattern to connect the first electrode pattern and the second electrode pattern.

In an embodiment of the invention, the shortest distance between the edge of the first pixel electrode and the edge of the second pixel electrode is a horizontal shortest distance W1, and the gap width between the second electrode pattern and the first electrode pattern is a horizontal gap width L1.

In an embodiment of the invention, the horizontal shortest distance W1 between the edge of the first pixel electrode and the edge of the second pixel electrode is smaller than or equal to the horizontal gap width L1 between the second electrode pattern and the first electrode pattern.

In an embodiment of the invention, the shortest distance between the edge of the first pixel electrode and the edge of the second pixel electrode is a vertical shortest distance W2, and the gap width between the second electrode pattern and the first electrode pattern is a vertical gap width L2.

In an embodiment of the invention, the vertical shortest distance W2 between the edge of the first pixel electrode and the edge of the second pixel electrode is smaller than or equal to the vertical gap width L2 between the second electrode pattern and the first electrode pattern.

According to the above descriptions, in the display panel provided by the invention, the first pixel electrode has the first main slit and a plurality of first branch slits, and the second pixel electrode has the second main slit and a plurality of second branch slits. Moreover, the horizontal shortest distance W1 between the edge of the first pixel electrode and the edge of the second pixel electrode is smaller than or equal to the horizontal gap width L1 between the second electrode pattern and the first electrode pattern; the vertical shortest distance W2 between the edge of the first pixel electrode and the edge of the second pixel electrode is smaller than or equal to the vertical gap width L2 between the second electrode pattern and the first electrode pattern. In this way, the liquid crystal molecules corresponding to a center of the sub-pixel have a trend of tilting outward, and the liquid crystal molecules corresponding to an edge of the sub-pixel also have a trend of tilting outward. The effect that the liquid crystal molecules in the pixel tilt outward in overall may decrease a width of the cross darkstripe to improve a transmittance of the display panel.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
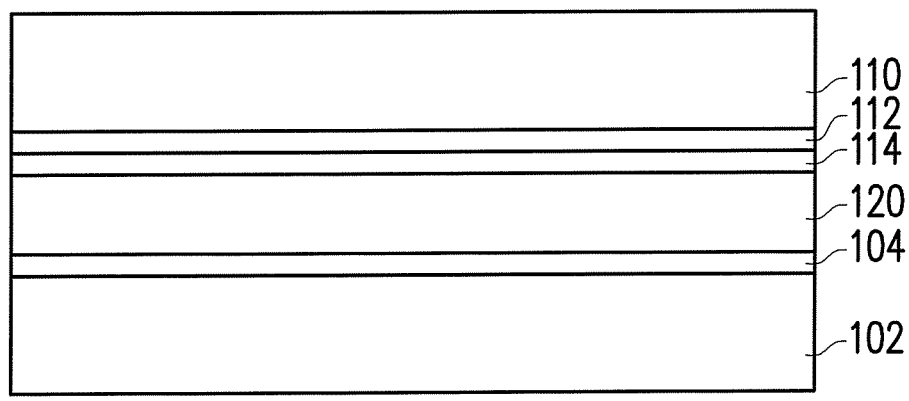
FIG. 1 is a cross-sectional view of a display panel according to an embodiment of the invention.

FIG. 1 is a cross-sectional view of a display panel according to an embodiment of the invention. Referring to FIG. 1, the display panel 100 of the present embodiment includes a first substrate 102, a second substrate 110 and a display media 120.

A material of the first substrate 102 includes glass, quartz, organic polymer or metal, etc. A pixel array layer 104 is disposed on the first substrate 102. A detailed composition structure of the pixel array layer 104 is described later.

The second substrate 110 is disposed opposite to the first substrate 102. A material of the second substrate 110 includes glass, quartz or organic polymer, etc. An electrode layer 114 is disposed on the second substrate 110. The electrode layer 114 is a transparent conductive layer, and a material thereof includes metal oxide, for example, indium tin oxide or indium zinc oxide. A pattern design of the electrode layer 114 is describe in detail later. A filter layer 112 can be further disposed on the second substrate 110, which includes a red, green, blue filter pattern.

The display media 120 is located between the first substrate 102 and the second substrate 110. The display media 120 includes liquid crystal molecules. Since the display panel of the present embodiment is a display panel using a polymer stabilized alignment (PSA) technique, besides the liquid crystal molecules, the display media 120 further includes a monomer compound. In other words, before an aging process of the monomer compound is performed to the display panel, the display media 120 includes the liquid crystal molecules and the monomer compound. When the aging process of the monomer compound is performed to the display panel, the monomer compound has a polymerisation reaction to four polymer film on surfaces of the pixel array layer 104 and the electrode layer 114. Therefore, after the aging process of the monomer compound is performed to the display panel, the display media 120 mainly includes the liquid crystal molecules.

Figure 2A:
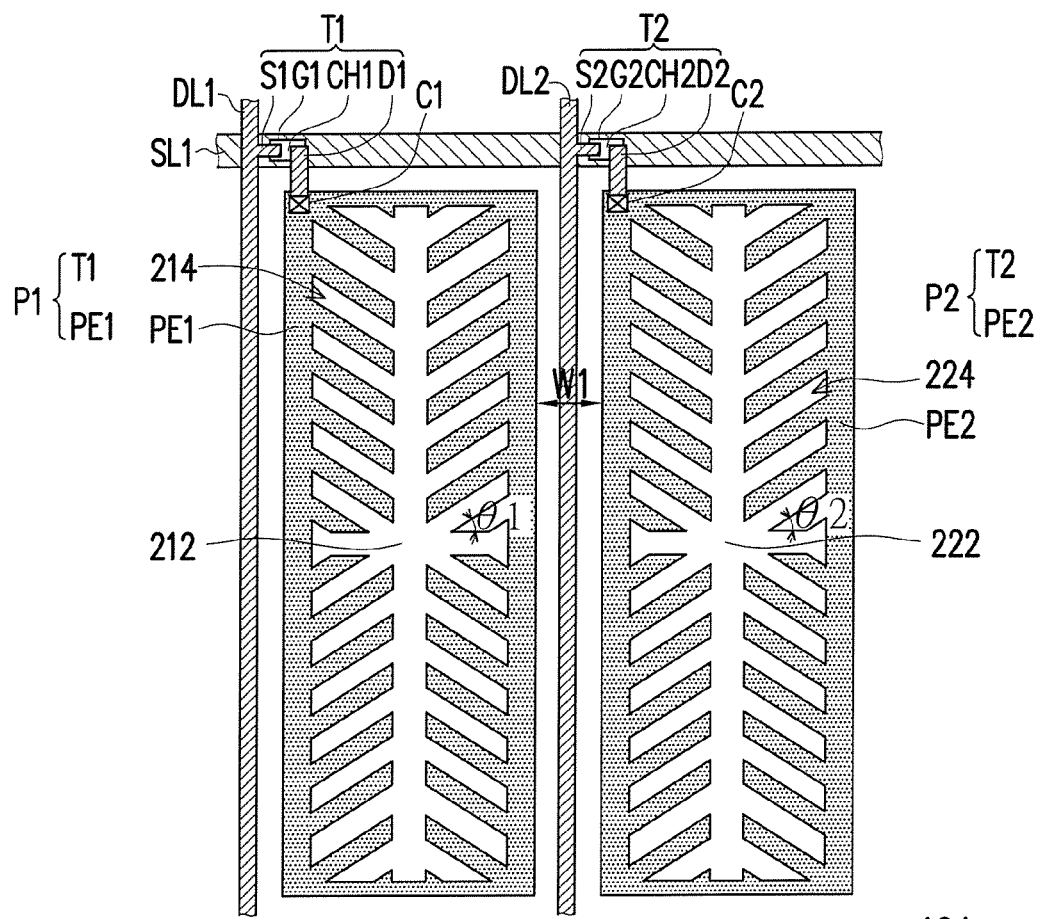
FIG. 2A is a top view of a pixel array layer according to an embodiment of the invention.
Figure 2B:
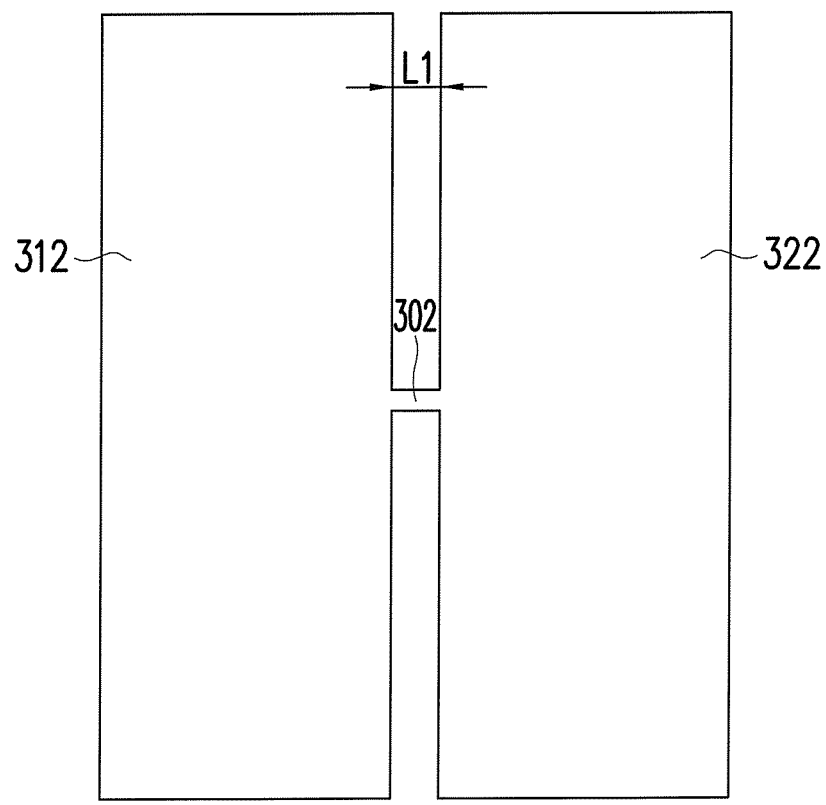
FIG. 2B is a top view of an electrode layer according to an embodiment of the invention.
Figure 3:
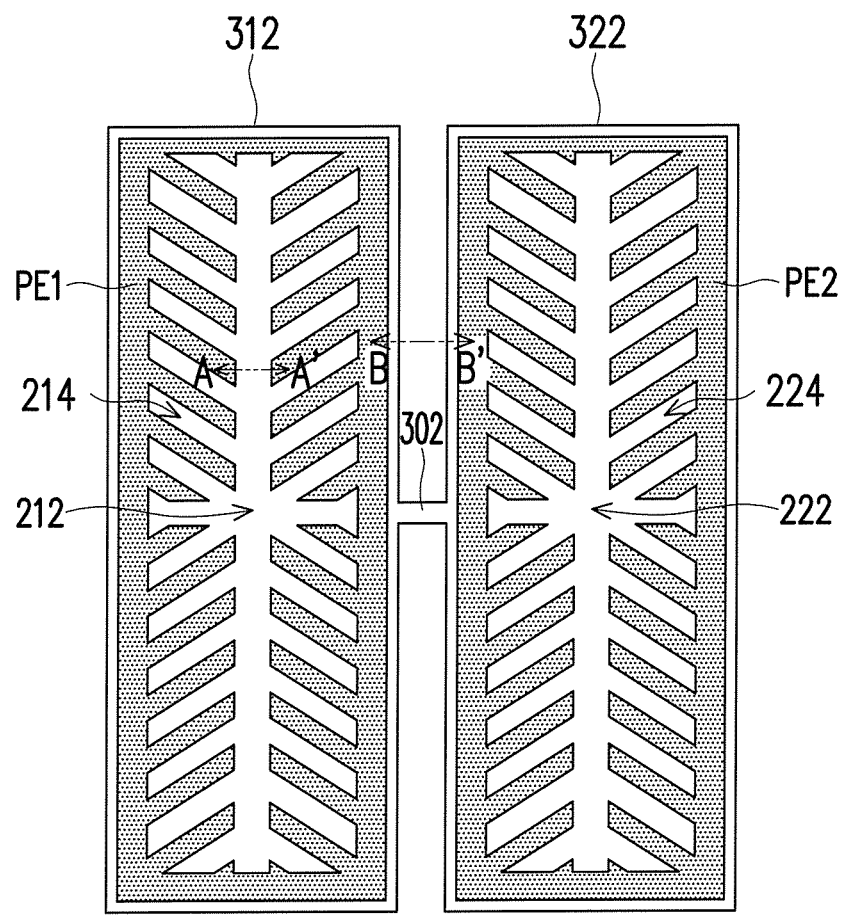
FIG. 3 is a schematic diagram of overlapping the pixel array layer of FIG. 2A and the electrode layer of FIG. 2B.

FIG. 2A is a top view of a pixel array layer according to an embodiment of the invention. FIG. 2B is a top view of an electrode layer according to an embodiment of the invention. FIG. 3 is a schematic diagram of overlapping the pixel array layer of FIG. 2A and the electrode layer of FIG. 2B.

Referring to FIG. 2A, the pixel array layer 104 includes a scan line SL1, data lines DL1, DL2 and sub-pixels P1, P2. In the present embodiment, the scan line SL1 and the data lines DL1 and DL2 are not disposed in parallel, and the scan line SL1 and the data lines DL1 and DL2 include an insulation layer therebetween. In other words, an extending direction of the scan line SL1 is not parallel with an extending direction of the data lines DL1 and DL2, and preferably, the extending direction of the scan line SL1 is perpendicular to the extending direction of the data lines DL1 and DL2. Considering conductivity, the scan line SL1 and the data lines DL1 and DL2 generally use a metal material. However, the invention is not limited thereto, and in other embodiments, the scan line SL1 and the data lines DL1 and DL2 may also use other conductive material, for example, alloy, nitride of metal material, oxide of metal material, nitrogen oxide of metal material or other suitable materials, or a stacked layer of other conductive materials.

The sub-pixels P1 and P2 respectively have active devices T1 and T2 and pixel electrodes PE1 and PE2. The active device T1 is electrically connected to the scan line SL1 and the data line DL1, and the active device T2 is electrically connected to the scan line SL1 and the data line DL2. The active devices T1 and T2 are, for example, thin-film transistors, and respectively include gates G1 and G2, channel layers CH1 and CH2, sources Si and S2, and drains D1 and D2. The gates G1 and G2 are electrically connected to the scan line SL1. The source Si is electrically connected to the data line DL1, and the source S2 is electrically connected to the data line DL2. The channel layers CH1 and CH2 are located above the gates G1 and G2, and are located under the sources Si and S2 and the drains D1 and D2. The active devices Ti and T2 of the present embodiment are, for example, two bottom gate type thin-film transistors, though the invention is not limited thereto, and in other embodiments, the active devices T1 and T2 can also be top gate type thin-film transistors.

The pixel electrodes PE1 and PE2 are electrically connected to the active devices T1 and T2, respectively. In the present embodiment, the pixel electrodes PE1 and PE2 are electrically connected to the drains D1 and D2 of the active devices T1 and T2, respectively. In detail, contact windows C1 and C2 are respectively disposed at overlapping parts between the pixel electrodes PE1 and PE2 and the drains D1 and D2 of the active devices T1 and T2, so as to implement electrical connection between the pixel electrodes PE1 and PE2 and the drains D1 and D2. Moreover, in FIG. 2A, the pixel electrodes PE1 and PE2 are not overlapped with the scan line SL1 and the data lines DL1 and DL2, though the invention is not limited thereto. Namely, the pixel electrodes PE1 and PE2 can also be set to overlap the scan line SL1 and the data lines DL1 and DL2.

It should be noticed that the pixel electrode PE1 has a main slit 212 and a plurality of branch slits 214 connected to the main slit 212. Moreover, the pixel electrode PE2 also has a main slit 222 and a plurality of branch slits 224 connected to the main slit 222. The main slits 212 and 222 and the branch slits 214 and 224 are void regions without the conductive material. As shown in FIG. 2A, the main slits 212 and 222 are all cross shaped slits, and the branch slits 214 and 224 respectively extend from the main slits 212 and 222 towards four directions, and included angles θ1 and θ2 between the branch slits 214 and 224 and the main slits 212 and 222 are not equal to 0 degree or 90 degrees.

Referring to FIG. 2B, the electrode layer 114 includes a plurality of electrode patterns 312 and 322. In the present embodiment, the electrode patterns 312 and 322 are all block electrodes. Particularly, the electrode pattern 312 is set corresponding to the pixel electrode PE1, and the electrode pattern 322 is set corresponding to the pixel electrode PE2. Moreover, in the present embodiment, the electrode layer 114 further includes a connecting portion 302. As shown in FIG. 2B, the connecting portion 302 is located between the electrode pattern 312 and the electrode pattern 322 to connect the electrode pattern 312 and the electrode pattern 322.

FIG. 3 is a diagram showing an overlap status between the pixel electrodes PE1 and PE2 and the electrode patterns 312 and 322, and for clarity's sake, the scan line, the data lines, and the active devices are not drawn. Referring to FIG. 3, since the electrode patterns 312 and 322 are respectively set corresponding to the pixel electrodes PE1 and PE2, the pixel electrodes PE1 and PE2 are overlapped with the electrode patterns 312 and 322. Moreover, the connecting portion 302 between the electrode patterns 312 and 322 is not overlapped with the pixel electrodes PE1 and PE2. In the present embodiment, FIG. 2A, FIG. 2B and FIG. 3 illustrate one pixel unit 130 in the display panel 100 of FIG. 1. Generally, the display panel 100 is composed of a plurality of pixel units 130 arranged in repetition.

In detail, referring to FIG. 2A, an edge of the pixel electrode PE1 and an edge of the pixel, electrode PE2 have a horizontal shortest distance W1 therebetween. To be specific, the edge of the pixel electrode PE1 and the edge of the pixel electrode PE2 have an equidistant gap along the horizontal direction, and the horizontal equidistant gap is equal to W1. Moreover, referring to FIG. 2B, the electrode pattern 312 and the electrode pattern 322 have a horizontal gap width L1 therebetween. To be specific, the electrode pattern 312 and the electrode pattern 322 have an equidistant gap along the horizontal direction, and the horizontal equidistant gap is equal to L1. It should be noticed that according to an embodiment of the invention, the horizontal shortest distance W1 between the edge of the pixel electrode PE1 and the edge of the pixel electrode PE2 is smaller than or equal to the horizontal gap width L1 between the electrode pattern 312 and the electrode pattern 322.

Figure 4A:
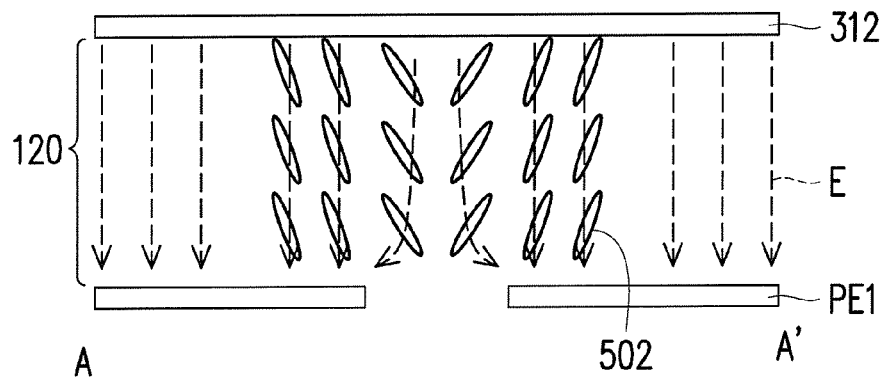
FIG. 4A is a cross-sectional view of FIG. 3 along a section line A-A' after an electric field is applied.
Figure 4B:
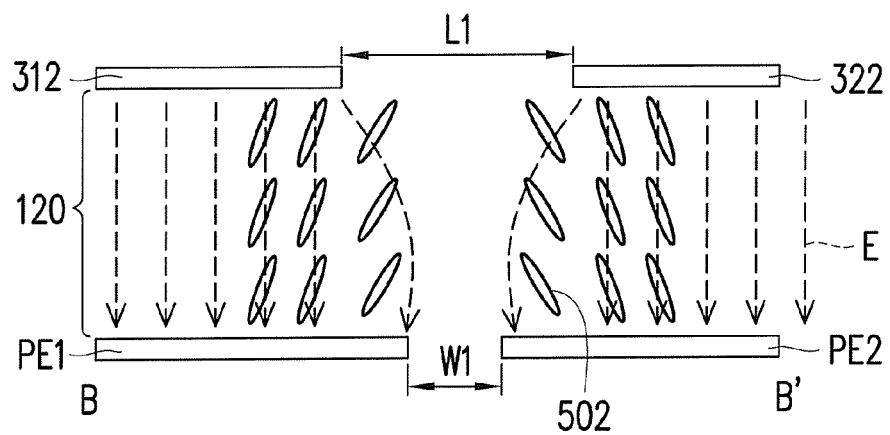
FIG. 4B a cross-sectional view of FIG. 3 along a section line B-B' after the electric field is applied.

FIG. 4A is a cross-sectional view of FIG. 3 along a section line A-A' after an electric field is applied. FIG. 4B a cross-sectional view of FIG. 3 along a section line B-B' after the electric field is applied. FIG. 4A shows a central part (the section line A-A') of a sub-pixel, and FIG. 4B (the section line B-B') shows a position between the edge of the electrode pattern 312 and the pixel electrode PE1 and the edge of the electrode pattern 322 and the pixel electrode PE2.

Referring to FIG. 4A, the display media 120 between the electrode pattern 312 and the pixel electrode PE1 includes liquid crystal molecules 502, and when an electric field E is formed between the electrode pattern 312 and the pixel electrode PE1, the liquid crystal molecules 502 of the display media 120 have a trend of tilting outward, from a center of the sub-pixel. Since the liquid crystal molecules 502 tilt outward from the center of the sub-pixel, a width of a cross darkstripe of the sub-pixel is decreased, so as to increase a transmittance of the display panel.

Moreover, referring to FIG. 4B, the electrode pattern 312 and the electrode pattern 322 have the horizontal gap width L1 therebetween, and the pixel electrode PE1 and the pixel electrode PE2 have the horizontal shortest distance W1 therebetween, and the horizontal shortest distance W1 is smaller than the horizontal gap width L1. When the electric field E is formed between the electrode pattern 312 and the pixel electrode PE1, the liquid crystal molecules 502 tilt towards an edge of the sub pixel. Since the liquid crystal molecules 502 located at the edge of the sub-pixel also tilt outward from the sub-pixel, the width of the darkstripe at the edge of the sub-pixel is decreased, so as to increase the transmittance of the display panel.

It should be noticed that in the embodiment of FIG. 4A and FIG. 4B, the horizontal shortest distance W1 is smaller than the horizontal gap width L1, though the invention is not limited thereto. In other embodiments, the horizontal shortest distance W1 can also be equal to the horizontal gap width L1. Regardless of whether the horizontal gap width L1 between the electrode pattern 312 and electrode pattern 322 is greater than the horizontal shortest distance W1 between the pixel electrode PE1 and the pixel electrode PE2, or the horizontal gap width L1 between the electrode pattern 312 and electrode pattern 322 is equal to the horizontal shortest distance W1 between the pixel electrode PE1 and the pixel electrode PE2, the effects of decreasing the width of the cross darkstripe of the sub-pixel and the width of the edge darkstripe to increase the transmittance of the display panel are achieved.

Figure 5A:
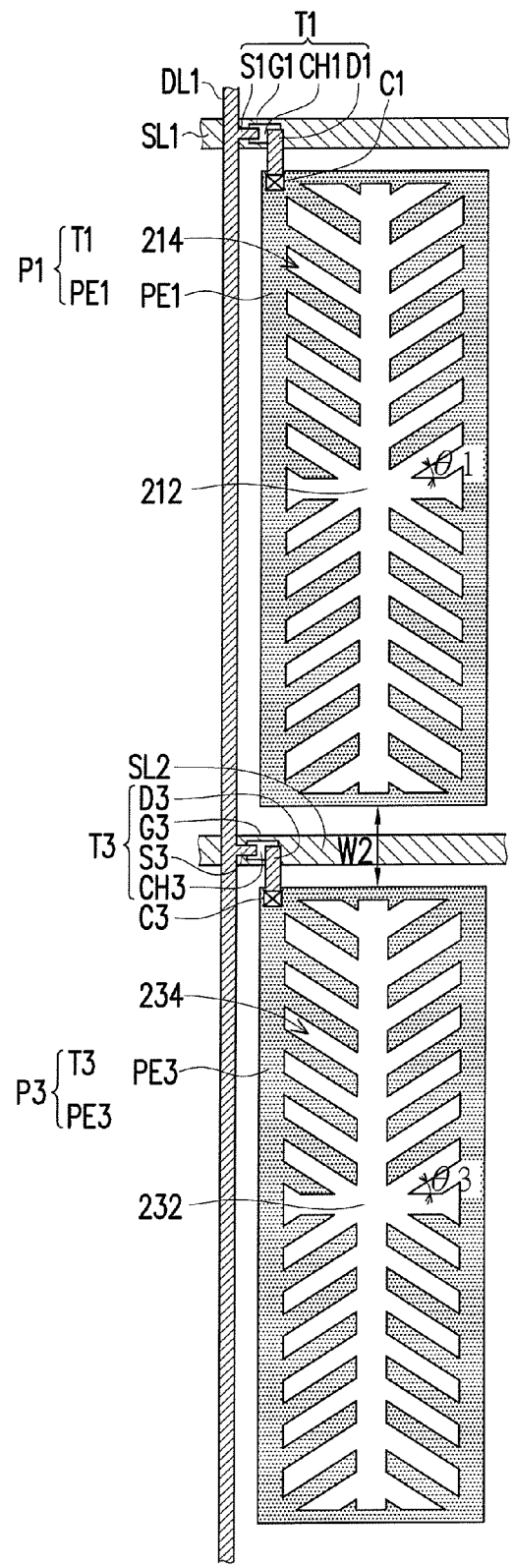
FIG. 5A is a top view of a pixel array layer according to another embodiment of the invention.
Figure 5B:
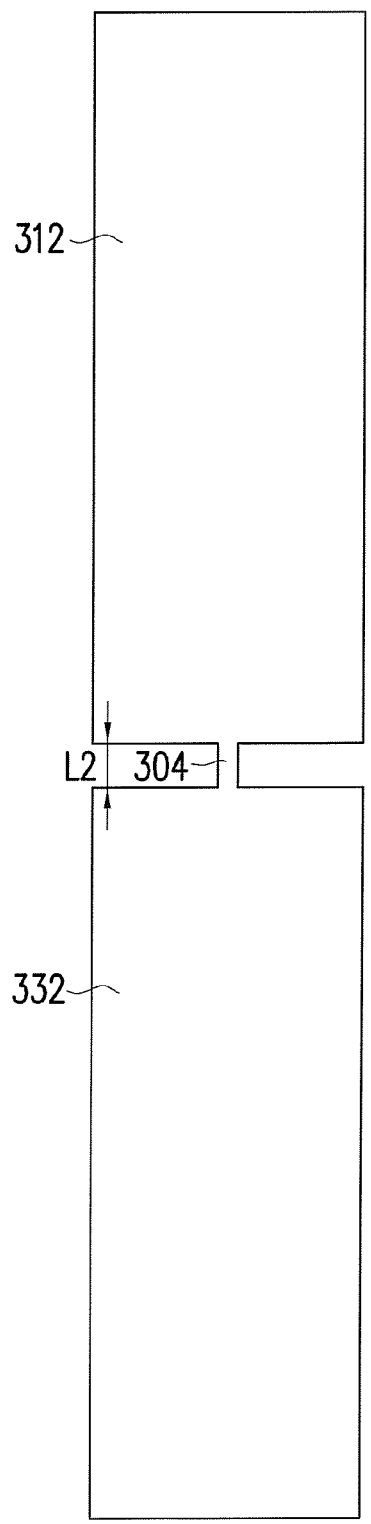
FIG. 5B is a top view of an electrode layer according to another embodiment of the invention.
Figure 6:
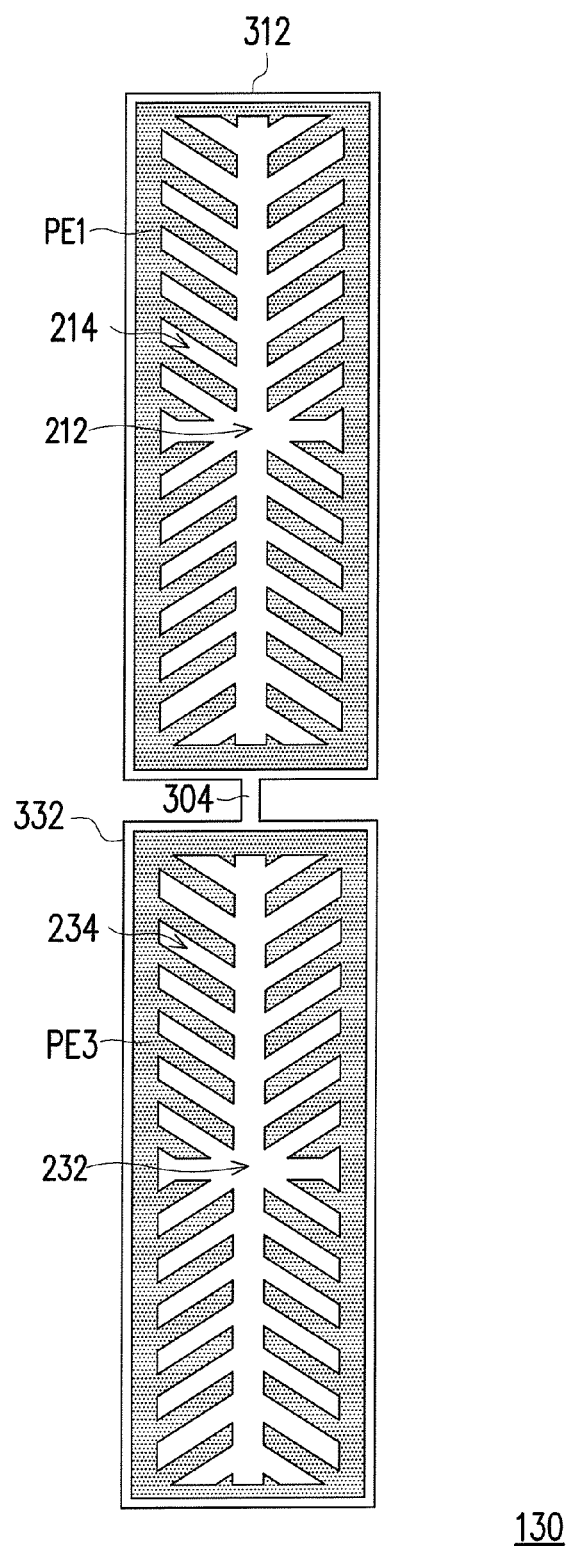
FIG. 6 is a schematic diagram of overlapping the pixel array layer of FIG. 5A with the electrode layer of FIG. 5B.

FIG. 5A is a top view of a pixel array layer according to another embodiment of the invention. FIG. 5B is a top view of an electrode layer according to another embodiment of the invention. FIG. 6 is a schematic diagram of overlapping the pixel array layer of FIG. 5A with the electrode layer of FIG. 5B. The embodiment of FIG. 5A, FIG. 5B and FIG. 6 is similar to the embodiment of FIG. 2A, FIG. 2B and FIG. 3, so that the same components are denoted by the same referential numbers and descriptions thereof are not repeated. A difference between the embodiment of FIG. 5A, FIG. 5B and FIG. 6 and the embodiment of FIG. 2A, FIG. 2B and FIG. 3 is that the pixel unit includes scan lines SL1 and SL2, a data line DL1, sub-pixels P1 and P3 located on the pixel array layer 104 and electrode patterns 312 and 332 and a connecting portion 304 located on the electrode layer 114.

As shown in FIG. 5A, the sub-pixel P3 has an active device T3 and a pixel electrode PE3. The active device T3 is electrically connected to the scan line SL2 and the data line DL1. Here, the active device T3 is, for example, a thin-film transistor, which includes a gate G3, a channel layer CH3, a source S3 and a drain D3. The gate G3 is electrically connected to the scan line SL2. The source S3 is electrically connected to the data line DL1. The channel layer CH3 is located above the gate G3 and is located under the source S3 and the drain D3. The active device T3 of the present embodiment is, for example, a bottom gate type thin-film transistor, though the invention is not limited thereto, and in other embodiments, the active device T3 can also be a top gate type thin-film transistor.

Referring to FIG. 5A, the pixel electrode PE3 is electrically connected to the active device T3. In the present embodiment, the pixel electrode PE3 is electrically connected to the drain D3 of the active device T3. In detail, a contact window C3 is disposed at an overlapping part between the pixel electrode PE3 and the drain D3 of the active device T3, so as to implement the electrical connection between the pixel electrode PE3 and the drain D3.

Moreover, in FIG. 5A, the pixel electrode PE3 is not overlapped with the scan line SL2 and the data line DL1, though the invention is not limited thereto. Namely, the pixel electrode PE3 can also be set to overlap the scan line SL2 and the data line DL1. The pixel electrode PE3 has a main slit 232 and a plurality of branch slits 234 connected to the main slit 232. It should be noticed that the main slit 232 and the branch slits 234 are void regions without the conductive material. As shown in FIG. 5A, the main slit 232 is a cross shaped slit, and the branch slits 234 respectively extend from the main slit 232 towards four directions, and an included angle θ3 between the branch slits 234 and the main slit 232 is not equal to 0 degree or 90 degrees.

Referring to FIG. 5B, the electrode patterns 312 and 332 of the electrode layer 114 are all block electrodes, where the electrode pattern 312 is set corresponding to the pixel electrode PE1, and the electrode pattern 332 is set corresponding to the pixel electrode PE3. Moreover, in the present embodiment, the electrode layer 114 further includes the connecting portion 304, and the connecting portion 304 is located between the electrode pattern 312 and the electrode pattern 332 to connect the electrode pattern 312 and the electrode pattern 332.

FIG. 6 is a diagram showing an overlap status between the pixel electrodes PE1 and PE3 and the electrode patterns 312 and 332, and for clarity's sake, the scan lines SL1 and SL2, the data line DL1, the active devices T1 and T3, and the display media 120 between the pixel array layer 104 and the electrode layer 114 are not drawn. Referring to FIG. 6, since the electrode patterns 312 and 332 are respectively set corresponding to the pixel electrodes PE1 and PE3, the pixel electrodes PE1 and PE3 are overlapped with the electrode patterns 312 and 332. Moreover, the connecting portion 304 is not overlapped with the pixel electrodes PE1 and PE3. In the present embodiment, FIG. 5A, FIG. 5B and FIG. 6 illustrate one pixel unit 130 in the display panel 100 of FIG. 1. Generally, the display panel 100 is composed of a plurality of pixel units 130 arranged in repetition.

In detail, referring to FIG. 5A, an edge of the pixel electrode PE1 and an edge of the pixel electrode PE3 have a vertical shortest distance W2 therebetween. To be specific, the edge of the pixel electrode PE1 and the edge of the pixel electrode PE3 have an equidistant gap along the vertical direction, and the vertical equidistant gap is equal to W2. Moreover, referring to FIG. 5B, the electrode pattern 312 and the electrode pattern 332 have a vertical gap width L2 therebetween. To be specific, the electrode pattern 312 and the electrode pattern 332 have an equidistant gap along the vertical direction, and the vertical equidistant gap is equal to L2. It should be noticed that according to an embodiment of the invention, the vertical shortest distance W2 between the edge of the pixel electrode PE1 and the edge of the pixel electrode PE3 is smaller than or equal to the vertical gap width L2 between the electrode pattern 312 and the electrode pattern 332.

Figure 7A:
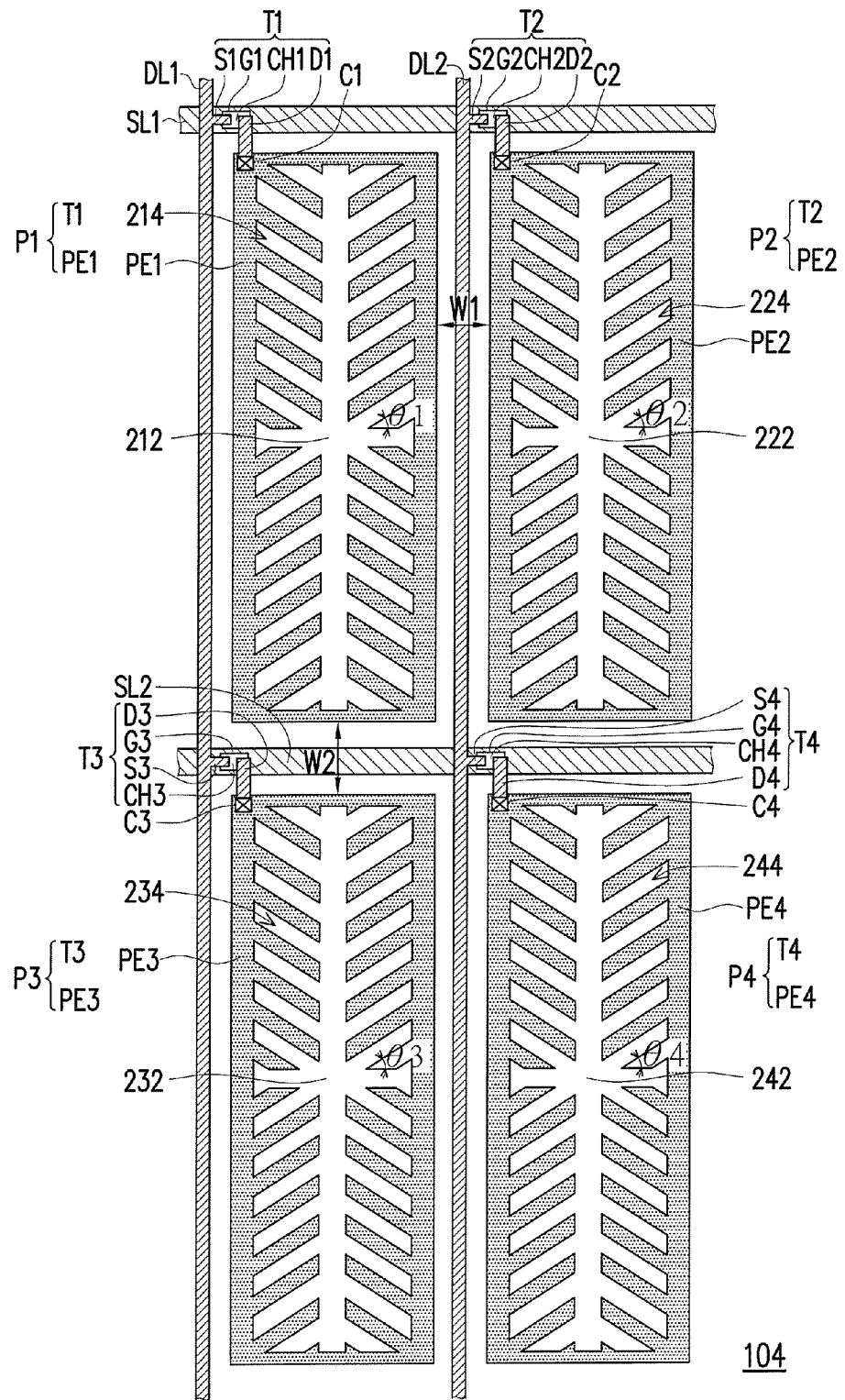
FIG. 7A is a top view of a pixel array layer according to another embodiment of the invention.
Figure 7B:
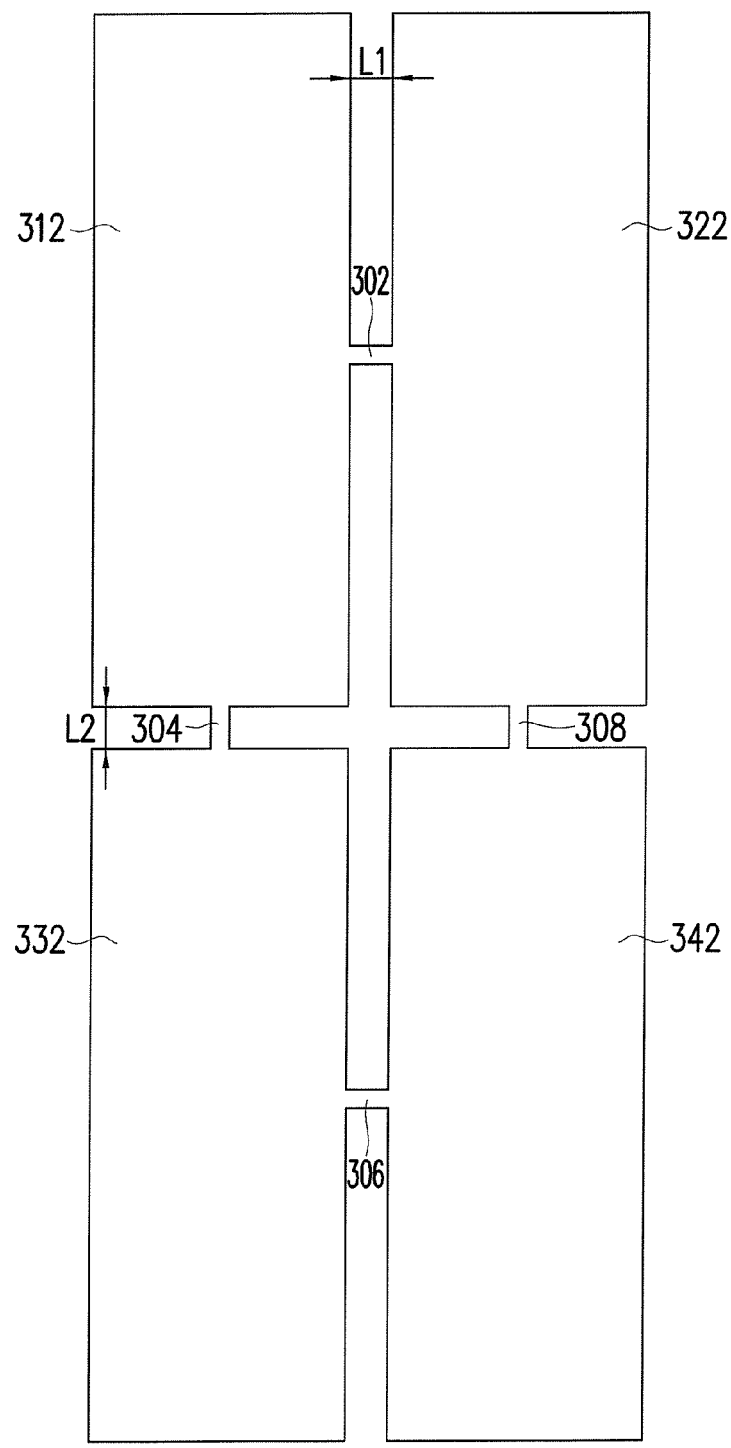
FIG. 7B is a top view of an electrode layer according to another embodiment of the invention.
Figure 8:
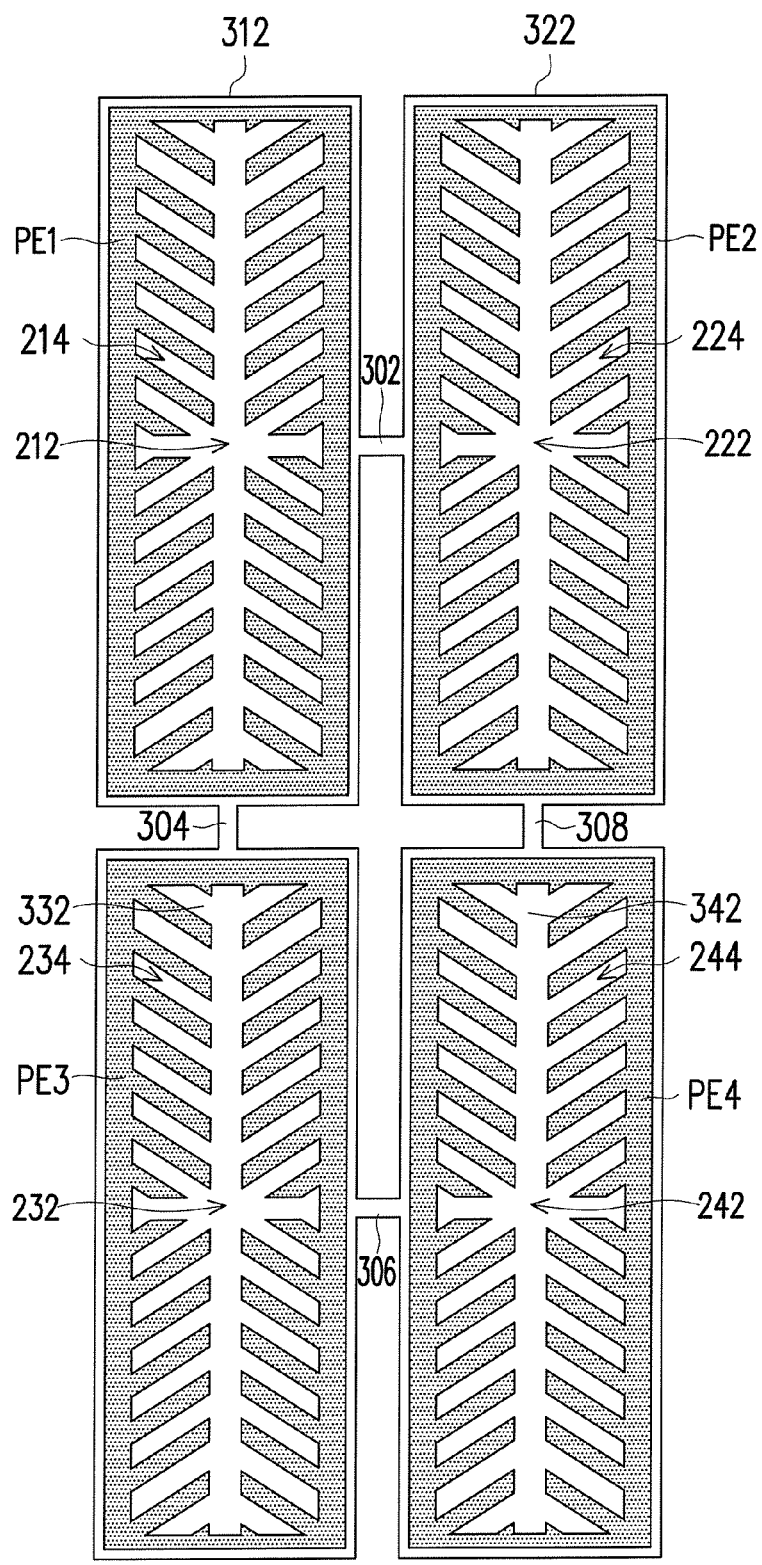
FIG. 8 is a schematic diagram of overlapping the pixel array layer of FIG. 7A with the electrode layer of FIG. 7B.

FIG. 7A is a top view of a pixel array layer according to another embodiment of the invention. FIG. 7B is a top view of an electrode layer according to another embodiment of the invention. FIG. 8 is a schematic diagram of overlapping the pixel array layer of FIG. 7A with the electrode layer of FIG. 7B. The embodiment of FIG. 7A, FIG. 7B and FIG. 8 is similar to the embodiment of FIG. 2A, FIG. 2B and FIG. 3, so that the same components are denoted by the same referential numbers and descriptions thereof are not repeated. A difference between the embodiment of FIG. 7A, FIG. 7B and FIG. 8 and the embodiment of FIG. 2A, FIG. 2B and FIG. 3 is that the pixel unit includes scan lines SL1 and SL2, data lines DL1 and DL2, sub-pixels P1, P2, P3 and P4 located on the pixel array layer 104 and electrode patterns 312, 322, 332 and 342 and connecting portions 302, 304, 306 and 308 located on the electrode layer 114.

Referring to FIG. 7A, the sub-pixel P4 has an active device T3 and a pixel electrode PE4. The active device T4 is electrically connected to the scan line SL2 and the data line DL2. Here, the active device T4 is, for example, a thin-film transistor, which includes a gate G4, a channel layer CH4, a source S4 and a drain D4. The gate G4 is electrically connected to the scan line SL2. The source S4 is electrically connected to the data line DL2. The channel layer CH4 is located above the gate G4 and is located under the source S4 and the drain D4. The active device T4 of the present embodiment is, for example, a bottom gate type thin-film transistor, though the invention is not limited thereto, and in other embodiments, the active device T4 can also be a top gate type thin-film transistor.

Referring to FIG. 7A, the pixel electrode PE4 is electrically connected to the active device T4. In the present embodiment, the pixel electrode PE4 is electrically connected to the drain D4 of the active device T4. In detail, a contact window C4 is disposed at an overlapping part between the pixel electrode PE4 and the drain D4 of the active device T4, so as to implement the electrical connection between the pixel electrode PE4 and the drain D4. Moreover, the pixel electrode PE4 is not overlapped with the scan line SL2 and the data line DL2, though the invention is not limited thereto. Namely, the pixel electrode PE4 can also be set to overlap the scan line SL2 and the data line DL2. Moreover, the pixel electrode PE4 has a main slit 242 and a plurality of branch slits 244 connected to the main slit 242. It should be noticed that the main slit 242 and the branch slits 244 are void regions without the conductive material. As shown in FIG. 7A, the main slit 242 is a cross shaped slit, and the branch slits 244 respectively extend from the main slit 242 towards four directions, and an included angle θ4 between the branch slits 244 and the main slit 242 is not equal to 0 degree or 90 degrees.

Referring to FIG. 7B, the electrode patterns 312, 322, 332 and 342 of the electrode layer 114 are all block electrodes. The electrode pattern 312 is set corresponding to the pixel electrode PE1, the electrode pattern 322 is set corresponding to the pixel electrode PE2, the electrode pattern 332 is set corresponding to the pixel electrode PE3, and the electrode pattern 342 is set corresponding to the pixel electrode PE4. Moreover, in the present embodiment, besides the connecting portions 302 and 304, the electrode layer 114 further includes connecting portions 306 and 308. As shown in FIG. 5B, the connecting portion 306 is located between the electrode pattern 332 and the electrode pattern 342 to connect the electrode pattern 332 and the electrode pattern 342, and the connecting portion 308 is located between the electrode pattern 322 and the electrode pattern 342 to connect the electrode pattern 322 and the electrode pattern 342.

FIG. 8 is a diagram showing an overlap status between the pixel array layer of FIG. 7A and the electrode layer of FIG. 7B. FIG. 8 mainly illustrates the overlap status between the pixel electrodes PE1, PE2, PE3 and PE4 and the electrode patterns 312, 322, 332 and 342. For clarity's sake, the scan lines SL1 and SL2, the data lines DL1 and DL2, the active devices T1, T2, T3 and T4, and the display media 120 between the pixel array layer 104 and the electrode layer 114 are not drawn. Referring to FIG. 8, since the electrode patterns 312, 322, 332 and 342 are respectively set corresponding to the pixel electrodes PE1, PE2, PE3 and PE4, the pixel electrodes PE1, PE2, PE3 and PE4 are overlapped with the electrode patterns 312, 322, 332 and 342. Moreover, the connecting portions 302, 304, 306 and 308 are not overlapped with the pixel electrodes PE1, PE2, PE3 and PE4. In the present embodiment, FIG. 7A, FIG. 7B and FIG. 8 illustrate one pixel unit 130 in the display panel 100 of FIG. 1. Generally, the display panel 100 is composed of a plurality of pixel units 130 arranged in repetition.

In detail, referring to FIG. 7A, the edge of the pixel electrode PE1 and the edge of the pixel electrode PE2 have a horizontal shortest distance W1 therebetween. The edge of the pixel electrode PE1 and the edge of the pixel electrode PE3 have a vertical shortest distance W2 therebetween. Referring to FIG. 7B, the electrode pattern 312 and the electrode pattern 322 have a horizontal gap width L1 therebetween. The electrode pattern 312 and the electrode pattern 332 have a vertical gap width L2 therebetween. The horizontal shortest distance W1 is smaller than or equal to the horizontal gap width L1, and the vertical shortest distance W2 is smaller than or equal to the vertical gap width L2.

In each of the above embodiments, the edges of the electrode patterns of the electrode layer 114 are all straight lines, though the invention is not limited thereto, and in other embodiments, the edges of the electrode patterns of the electrode layer 114 can also be edge slits, which is described below.

Figure 9:
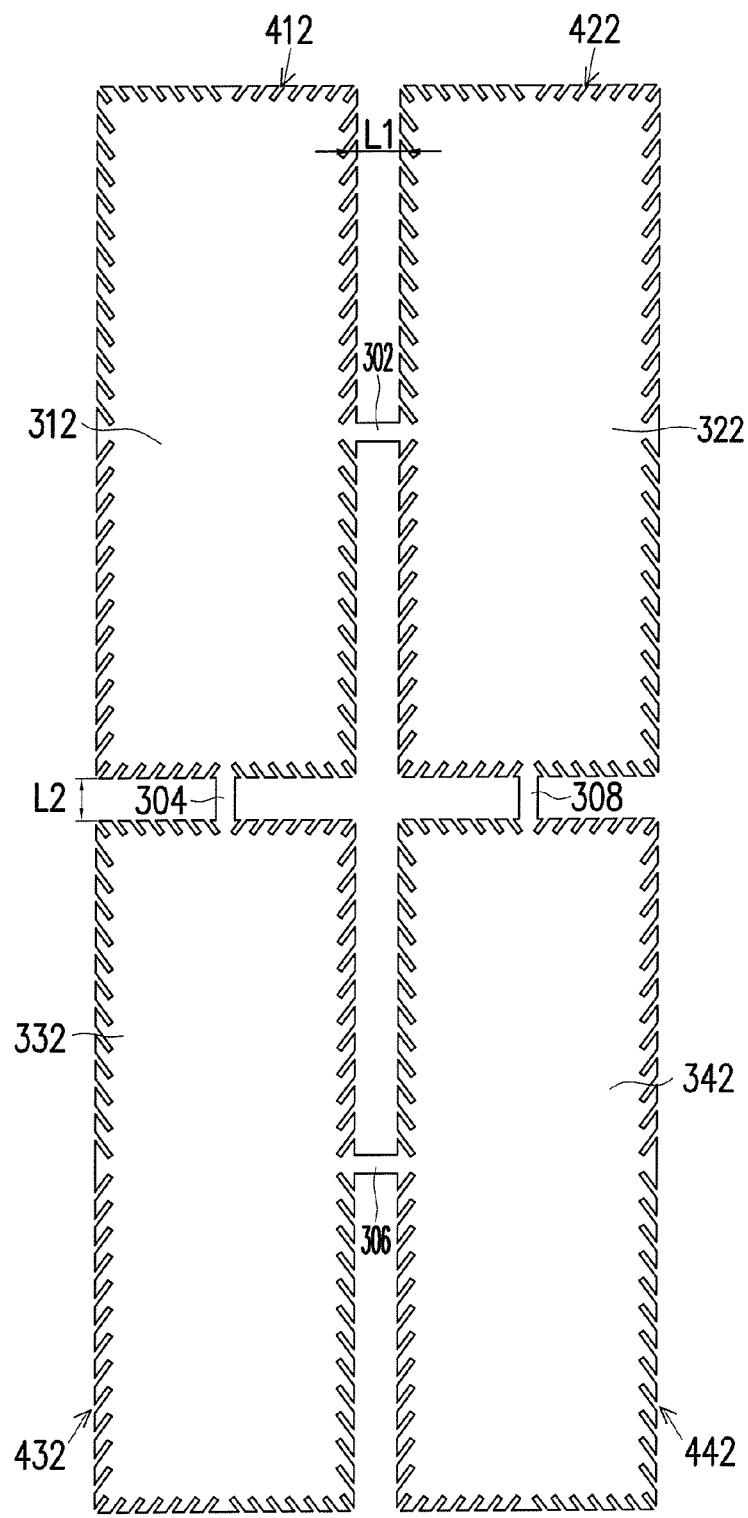
FIG. 9 is a top view of an electrode layer according to still another embodiment of the invention.

Referring to FIG. 9, a difference between the electrode layer of FIG. 9 and the electrode layer of FIG. 7B is that the edges of the electrode pattern 312 have a plurality of edge slits 412, the edges of the electrode pattern 322 have a plurality of edge slits 422, the edges of the electrode pattern 332 have a plurality of edge slits 432, and the edges of the electrode pattern 342 have a plurality of edge slits 442. In the present embodiment, the extending directions of the edge slits 412, 422, 432 and 442 are respectively parallel to extending directions of the branch slits (for example, the branch slits 214, 224, 234, 244 of FIG. 7A) in the pixel electrodes. Namely, the extending direction of the edge slits 412 is parallel to the extending direction of the branch slits 214, the extending direction of the edge slits 422 is parallel to the extending direction of the branch slits 224, the extending direction of the edge slits 432 is parallel to the extending direction of the branch slits 234, and the extending direction of the edge slits 442 is parallel to the extending direction of the branch slits 244.

Experiment

A following table 1 lists transmittances of different display panels and increasing rate thereof, where the pixel units in the display panel of a comparison example are pixel units applying the conventional PSA technique. The pixel units in the display panels of implementation 1 and implementation 2 are as that shown in FIG. 7B and FIG. 8 and in the pixel unit of the display panel of the implementation 1, the horizontal shortest distance W1 is smaller than the horizontal gap width L1. In the pixel unit of the display panel of the implementation 2, the shortest distance W1 is equal to the gap width L1. The pixel units in the display panel of the implementation 3 are as that shown in FIG. 7A and FIG, 9, i.e. the electrode patterns are block electrodes having a plurality of edge slits at the edges, and the shortest distance W1 is equal to the gap width L1. It should be noticed that in the implementation 1, the implementation 2 and the implementation 3, the horizontal shortest distance W1 is equal to the vertical shortest distance W2, and the horizontal gap width L1 is equal to the vertical gap width L2, though the invention is not limited thereto.

TABLE 1

| | Condition | transmittance (%) | Increasing rate (%) |
|---|---|---|---|
| Comparison example | None | 26.08% | — |
| Implementation 1 | L1 > W1 | 28.99% | 11.16% |
| Implementation 2 | L1 = W1 | 30.27% | 16.07% |
| Implementation 3 | L1 = W1 | 31.09% | 19.21% |

According to the above table 1, it is learned that the transmittance of the display panel of the comparison example, is 26.08%. Comparatively, the transmittance of the display panel of the implementation 1 is 28.99%, and the transmittance is increased by 11.16%. The transmittance of the display panel of the implementation 2 is 30.27%, and the transmittance is increased by 16.07%. The transmittance of the display panel of the implementation 3 is 31.09%, and the transmittance is increased by 19.21%. Moreover, when the horizontal shortest distance W1 is equal to the horizontal gap width L1, the transmittance thereof is higher than that of the situation that the horizontal shortest distance W1 is smaller than the horizontal gap width L1. In addition, when the electrode patterns are block electrodes having a plurality of the edge slits at the edges, the transmittance of the display panel is further improved.

In summary, in the display panel provided by the invention, the first pixel electrode has the first main slit and a plurality of first branch slits, and the second pixel electrode has the second main slit and a plurality of second branch slits. Moreover, the horizontal shortest distance W1 between the edge of the first pixel electrode and the edge of the second pixel electrode is smaller than or equal to the horizontal gap width L1 between the second electrode pattern and the first electrode pattern; the vertical shortest distance W2 between the edge of the first pixel electrode and the edge of the second pixel electrode is smaller than or equal to the vertical gap width L2 between the second electrode pattern and the first electrode pattern. In this way, the liquid crystal molecules corresponding to a center of the sub-pixel have a trend of tilting outward, and the liquid crystal molecules corresponding to an edge of the sub-pixel also have a trend of tilting outward. The effect that the liquid crystal molecules in the pixel tilt outward in overall may decrease a width of the cross darkstripe to improve the transmittance of the display panel.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display panel, comprising a plurality of pixel units, each of the pixel units comprising:
   a first substrate, comprising:
      a first sub-pixel, comprising a first active device and a first pixel electrode electrically connected to the first active device, wherein the first pixel electrode has a first main slit and a plurality of first branch slits connected to the first main slit;
      a second sub-pixel, located adjacent to the first sub-pixel, and comprising a second active device and a second pixel electrode electrically connected to the second active device, wherein the second pixel electrode has a second main slit and a plurality of second branch slits connected to the second main slit, and an edge of the first pixel electrode and an edge of the second pixel electrode have a shortest distance therebetween;

a second substrate, disposed opposite to the first substrate, and comprising:
  a first electrode pattern, located corresponding to the first pixel electrode;
  a second electrode pattern, located corresponding to the second pixel electrode, wherein the second electrode pattern and the first electrode pattern have a gap width therebetween;
  a connecting portion, located between the first electrode pattern and the second electrode pattern to connect the first electrode pattern and the second electrode pattern; and
  a display media, located between the first substrate and the second substrate.

2. The display panel as claimed in claim 1, wherein the shortest distance between the edge of the first pixel electrode and the edge of the second pixel electrode is a horizontal shortest distance W1, and the gap width between the second electrode pattern and the first electrode pattern is a horizontal gap width L1.

3. The display panel as claimed in claim 2, wherein the horizontal shortest distance W1 between the edge of the first pixel electrode and the edge of the second pixel electrode is smaller than the horizontal gap width L1 between the second electrode pattern and the first electrode pattern.

4. The display panel as claimed in claim 2, wherein the horizontal shortest distance W1 between the edge of the first pixel electrode and the edge of the second pixel electrode is equal to the horizontal gap width L1 between the second electrode pattern and the first electrode pattern.

5. The display panel as claimed in claim 1, wherein the shortest distance between the edge of the first pixel electrode and the edge of the second pixel electrode is a vertical shortest distance W2, and the gap width between the second electrode pattern and the first electrode pattern is a vertical gap width L2.

6. The display panel as claimed in claim 5, wherein the vertical shortest distance W2 between the edge of the first pixel electrode and the edge of the second pixel electrode is smaller than the vertical gap width L2 between the second electrode pattern and the first electrode pattern.

7. The display panel as claimed in claim 5, wherein the vertical shortest distance W2 between the edge of the first pixel electrode and the edge of the second pixel electrode is equal to the vertical gap width L2 between the second electrode pattern and the first electrode pattern.

8. The display panel as claimed in claim 1, wherein the first main slit of the first pixel electrode is a cross shaped slit, and the first branch slits of the first pixel electrode extend towards four directions from the first main slit.

9. The display panel as claimed in claim 8, wherein an included angle between the first main slit and the first branch slits is not equal to 0 degree or 90 degrees.

10. The display panel as claimed in claim 8, wherein the first electrode pattern is a block electrode, and an edge of the block electrode has a plurality of edge slits.

11. The display panel as claimed in claim 10, wherein an extending direction of the edge slits is parallel to an extending direction of the first branch slits.

12. The display panel as claimed in claim 10, wherein the second main slit of the second pixel electrode is a cross shaped slit, and the second branch slits of the second pixel electrode extend towards four directions from the second main slit.

13. The display panel as claimed in claim 12, wherein an included angle between the second main slit and the second branch slits is not equal to 0 degree or 90 degrees.

14. The display panel as claimed in claim 12, wherein the second electrode pattern is a block electrode, and an edge of the block electrode has a plurality of edge slits.

15. The display panel as claimed in claim 14, wherein an extending direction of the edge slits is parallel to an extending direction of the second branch slits.

16. The display panel as claimed in claim 1, wherein the edge of the first pixel electrode and the edge of the second pixel electrode have a horizontal equidistant gap therebetween, and the horizontal equidistant gap is equal to W1.

17. The display panel as claimed in claim 1, wherein the edge of the first pixel electrode and the edge of the second pixel electrode have a vertical equidistant gap therebetween, and the vertical equidistant gap is equal to W2.

18. The display panel as claimed in claim 1, wherein the second electrode pattern and the first electrode pattern have a horizontal equidistant gap therebetween, and the horizontal equidistant gap is equal to L1.

19. The display panel as claimed in claim 1, wherein the second electrode pattern and the first electrode pattern have a vertical equidistant gap therebetween, and the vertical equidistant gap is equal to L2.

* * * * *